United States Patent
Schwarz et al.

(10) Patent No.: US 7,954,865 B2
(45) Date of Patent: Jun. 7, 2011

(54) IMPACT-LIMITING SYSTEM OF A MOTOR VEHICLE

(75) Inventors: Martin Schwarz, Stadecken-Elsheim (DE); Ute Kohlrieser, Pfungstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/198,809

(22) Filed: Aug. 26, 2008

(65) Prior Publication Data

US 2009/0058112 A1    Mar. 5, 2009

(30) Foreign Application Priority Data

Aug. 30, 2007  (DE) .................. 10 2007 040 942

(51) Int. Cl.
*B60R 19/03* (2006.01)
*B60R 19/18* (2006.01)
(52) U.S. Cl. .................. 293/120; 293/132; 293/122
(58) Field of Classification Search .................. 293/102, 293/132, 120, 121–126
See application file for complete search history.

(56) References Cited

U.S. PATENT DOCUMENTS

| | | | | |
|---|---|---|---|---|
| 380,069 | A | * | 3/1888 | Wilson et al. .................. 52/668 |
| 3,547,515 | A | * | 12/1970 | Shanok et al. .................. 359/549 |
| 3,574,379 | A | * | 4/1971 | Jordan .................. 293/109 |
| 3,861,110 | A | * | 1/1975 | Bartlett .................. 52/718.05 |
| 3,863,589 | A | * | 2/1975 | Guienne et al. .................. 114/219 |
| 3,865,358 | A | * | 2/1975 | Butters .................. 267/140 |
| 3,880,454 | A | * | 4/1975 | Haberle et al. .................. 293/121 |
| 3,897,095 | A | * | 7/1975 | Glance et al. .................. 293/120 |
| 3,997,208 | A | * | 12/1976 | Nomiyama .................. 293/102 |
| 4,145,077 | A | * | 3/1979 | Haberle et al. .................. 293/102 |
| 4,492,398 | A | * | 1/1985 | Peter .................. 293/120 |
| 4,542,925 | A | * | 9/1985 | Huber et al. .................. 293/120 |
| 4,856,833 | A | * | 8/1989 | Beekman .................. 293/120 |
| 4,998,761 | A | * | 3/1991 | Bayer et al. .................. 293/121 |
| 5,106,137 | A | * | 4/1992 | Curtis .................. 293/107 |
| 5,123,688 | A | * | 6/1992 | Takado et al. .................. 293/120 |
| 5,139,297 | A | * | 8/1992 | Carpenter et al. .................. 293/132 |
| 5,201,912 | A | * | 4/1993 | Terada et al. .................. 293/120 |
| 5,219,197 | A | * | 6/1993 | Rich et al. .................. 293/120 |
| 5,265,925 | A | * | 11/1993 | Cox et al. .................. 293/120 |
| 5,290,078 | A | * | 3/1994 | Bayer et al. .................. 293/120 |

(Continued)

FOREIGN PATENT DOCUMENTS

DE    3020997 A1    2/1982

(Continued)

OTHER PUBLICATIONS

German Patent Office, German Search Report for German Application No. 102007040942.9, Sep. 4, 2008.

(Continued)

*Primary Examiner* — Glenn Dayoan
*Assistant Examiner* — Pinel E Romain
(74) *Attorney, Agent, or Firm* — Ingrassia Fisher & Lorenz, P.C.

(57) ABSTRACT

An impact limiting system of a vehicle is provided with a cladding element and bumper substructure. The bumper substructure is spaced apart from the cladding element, and is covered by the cladding element. The bumper substructure is arranged on the vehicle body, and exhibits impact energy absorbing elements. The impact limiting system exhibits an impact force conveying element between the cladding element and bumper substructure.

11 Claims, 6 Drawing Sheets

U.S. PATENT DOCUMENTS

| | | | |
|---|---|---|---|
| 5,306,056 A | | 4/1994 | Vogelgesang |
| 5,441,319 A | * | 8/1995 | Oyama et al. ............... 293/155 |
| 5,580,109 A | * | 12/1996 | Birka et al. ............... 293/120 |
| 5,603,541 A | * | 2/1997 | Wada et al. ............... 293/102 |
| 5,967,592 A | * | 10/1999 | Freeman ............... 293/120 |
| 5,984,389 A | * | 11/1999 | Nuber et al. ............... 293/109 |
| 6,065,786 A | * | 5/2000 | Wheatley ............... 293/109 |
| 6,142,542 A | * | 11/2000 | Sherno ............... 293/132 |
| 6,308,999 B1 | * | 10/2001 | Tan et al. ............... 293/109 |
| 6,371,540 B1 | * | 4/2002 | Campanella et al. ............... 293/102 |
| 6,406,081 B1 | * | 6/2002 | Mahfet et al. ............... 293/133 |
| 6,412,836 B1 | * | 7/2002 | Mansoor et al. ............... 293/132 |
| 6,485,072 B1 | * | 11/2002 | Werner et al. ............... 293/132 |
| 6,547,295 B2 | * | 4/2003 | Vismara ............... 293/133 |
| 6,609,740 B2 | * | 8/2003 | Evans ............... 293/121 |
| 6,623,055 B2 | * | 9/2003 | Knaup et al. ............... 293/102 |
| 6,695,366 B2 | * | 2/2004 | Cherry ............... 293/120 |
| 6,764,117 B2 | * | 7/2004 | Jonsson ............... 293/109 |
| 6,863,322 B2 | * | 3/2005 | Hunter et al. ............... 293/120 |
| 7,004,519 B2 | * | 2/2006 | Roussel et al. ............... 293/120 |
| 7,204,531 B2 | * | 4/2007 | Kim ............... 293/120 |
| 7,556,297 B2 | * | 7/2009 | Ohno et al. ............... 293/120 |

FOREIGN PATENT DOCUMENTS

| | | |
|---|---|---|
| DE | 4201839 A1 | 7/1993 |
| DE | 10312510 B3 | 1/2005 |
| DE | 102005033074 A1 | 1/2007 |
| EP | 1775172 A2 | 4/2007 |
| FR | 2736315 A1 | 1/1997 |
| WO | 2004106117 A1 | 12/2004 |

OTHER PUBLICATIONS

European Patent Office, European Search Report for European Application No. 08013981.9, Apr. 28, 2009.

* cited by examiner

IMPACT-LIMITING SYSTEM OF A MOTOR VEHICLE

CROSS-REFERENCE TO RELATED APPLICATION

This application claims priority to German Patent Application No. 102007040942.9, filed Aug. 30, 2007, which is incorporated herein by reference in its entirety.

TECHNICAL FIELD

The technical field generally relates to an impact-limiting system of a motor vehicle, and more specifically relates to an impact-limiting system of a motor vehicle with a cladding element and a substructure of the fender or bumper where the cladding element is adjusted to the styling of the motor vehicle, while the bumper substructure comprises the actual impact limiter.

BACKGROUND

The bumper substructure is frequently spaced apart from the cladding element, creating a cavity between the bumper substructure and cladding element that can vary in depth depending on the vehicle type. This cavity adversely narrows a barrier penetration pathway that must be provided to ensure that no damage is done to the outer skin of the motor vehicle, in particular, even if the vehicle styling or design provides for a longer overhang.

This absence of damage must be ensured at low collision speeds, without body parts or the outer skin of the motor vehicle itself being touched or damaged. However, since the bumper substructure only becomes active once the cladding element has become dented during a collision to the point that the dented cladding element is able to convey the impact force to the bumper substructure, the bumper substructure must at great expense be adjusted to the various styling configurations of the different models within a series of motor vehicles to ensure the prescribed barrier penetration pathway for each of the models, and hence ensure the absence of damage to the body for each individual model.

In view of the foregoing, at least one object is to provide an impact-limiting system for a motor vehicle with a cladding element and a bumper substructure that can be used for different vehicles within a platform and/or bridge platforms with varying body overhangs. In addition, other objects, desirable features, and characteristics will become apparent from the subsequent summary and detailed description, and the appended claims, taken in conjunction with the accompanying drawings and this background.

SUMMARY

This at least one object, and other objects, desirable features, and characteristics, is achieved with an impact limiting system of a vehicle that has a cladding element and bumper substructure. The bumper substructure is arranged on the vehicle body, spaced apart from the cladding element, and covered by the cladding element. The bumper substructure exhibits impact energy absorbing elements and the impact limiting system exhibits an impact force conveying element arranged between the cladding element and bumper substructure.

At least one advantage to such an impact-limiting system is that varying gaps between the cladding element and bumper substructure are now filled by a impact force conveying element. As a result, the impact force-conveying element makes it possible to maintain the required penetration depths of the barriers despite uniform bumper substructures in different vehicle models. This ensures adherence to the required absence of damage given different styling configurations utilizing only one bumper substructure identical for all models.

Above all, the impact force conveying element permits optimal use of the resultant cavity created through the use of just one version of the bumper substructure given different styling contours. The barrier exposure area can here be specifically influenced by the impact force-conveying element.

In a preferred embodiment of the invention, the impact force conveying element forms a spacer, which is inserted between the cladding element and bumper substructure and balances out the styling differences between vehicle models relative to the barrier penetration pathway.

The impact force-conveying element is preferably dimensionally stable and rigid, and conveys the impact force acting on the cladding element to the bumper substructure. Therefore, it is important in terms of the configuration of the impact force conveying element that enough strength be provided to handle the forces that arise during an impact load in the low speed range, especially since the impact force conveying element cannot be allowed to fail at loads pursuant to standardized insurance classification tests and during the corresponding type verifications and tests usually performed in the US and Canada. Further, the structural design of the impact force conveying element must be such that uniform or only slightly deviating kinematics for the deforming overall impact limiting system set in during a collision or impact load, regardless of the size and depth of the impact force conveying element required to fill the gap between the cladding element and bumper substructure.

The impact force conveying element preferably exhibits a dimensionally stable, structured plastic compound, the contours of which are adjusted to the cladding element and bumper substructure. In order to ensure dimensional stability and rigidity for the plastic compound, this plastic compound can preferably exhibit a particle-filled plastic compound with a hard material particle fill level of about 40% v/v to about 80% v/v.

Such hard material particles are preferably ceramic particles, which are lighter in comparison to metal particles, and can be adjusted by way of the plastic compound to varying contours of the cladding element and bumper structure. The hard material particles can also have short fibers or whiskers, which elevates the dimensional stability and strength of the plastic compound.

As an alternative, the impact force conveying element can exhibit a dimensionally table, structured metal construction, the contours of which are also adjusted to the cladding element and bumper substructure. To save on weight, the impact force-conveying element can here have a honeycomb structure, and the honeycomb structural elements can exhibit checkerboard, tetragonal, hexagonal or polygonal shapes. In each case, however, the webs of the honeycomb structure are aligned in the impact force direction so as to ensure the function of an impact force-conveying element.

While the cladding element forms an outer skin for the impact limiting system, and can be adjusted to the styling of the respective vehicle model, the bumper substructure forms the actual impact limiter. The cladding element is frequently also referred to as a bumper skin, since it has no impact limiting function, and often only represents a beautifully designed cladding for the bumper structure.

In another embodiment of the invention, the bumper substructure exhibits deformation elements, which are preferably aligned in the impact force direction, and deform to a certain degree without the outer skin of the vehicle being damaged outside the impact limiting system. As a result, it is possible to switch or replace only the deformation elements in the impact limiting system according to an embodiment of the invention after a low-speed collision.

To this end, the bumper structure substructure preferably exhibits a dimensionally stable, flexible transverse carrier, which is supported on the deformation elements. This transverse carrier is dimensionally stable to an extent that the transverse carrier and impact force conveying element are only elastically deformed at low impact speeds, while the deformation elements are plastically and/or rubber-elastically deformed. The impact force-conveying element can here at least partially envelop the transverse carrier. It is also possible or the transverse carrier to partially envelope the impact force conveying element. Finally, the impact force-conveying element is positively fixated on the transverse carrier in another embodiment of the invention.

The impact force-conveying element can also exhibit latching hooks, which are used to clip it to the bumper substructure or cladding element. The cladding element and/or the bumper substructure can also be provided with attachment elements, to which the impact force-conveying element is secured. Attachment elements such as these, like screws or rivets, as well as the latching hooks together can ensure that the impact force-conveying element can be replaced after damage has been done. In addition, a positive joint can be established between the impact force conveying element and cladding element or bumper substructure via bonding or thermal joining, which might reduce manufacturing costs, but diminishes the switching capability given damage to the impact force conveying element specific to the latching hook or attachment elements.

It is further provided that that the impact force-conveying element be arranged in multiple pieces over the width of the bumper substructure. The advantage to this is that the replacement and repair costs can be reduced given damage to the impact force conveying element, since only the damaged segments of the impact force conveying element have to be changed out. It may be advantageous relative to the impact force distribution to provide a one-piece impact force-conveying element for the entire width of the bumper substructure.

The impact force-conveying element can exhibit a metal structure instead of a plastic structure. These types of structures can be based on an injection molded part, extruded section or welded structure or thermoformed part prefabricated from either plastic or metal. It is also possible to fabricate the impact force-conveying element as a single piece with the cladding element, and mount it along with the cladding element on the bumper substructure.

Depending on the attachment method used, corresponding sprues, round or oblong holes, welding nuts or bolts must be provided either on the bumper substructure or the cladding element so as to ensure a reliable assembly of the entire impact limiting system. At least some of the advantages of the impact limiting system according to at least one embodiment of the invention have to do with:

1. The cost-effective, rigid and light construction;
2. The high variability of the impact limiting system, and the impact force conveying element incorporated or attached as a spacer enables the use of a single bumper substructure for various styling configurations and body overhangs;
3. The use of the impact force-conveying element as a spacer in multiple models;
4. The lack of impairment to the "low-speed behavior" and "high-speed behavior" during collisions.

In another embodiment of the invention, the bumper substructure can exhibit a metal part from an extruded section or welded structure, which is situated between the transition from the deformation elements to the body. This metal part can exhibit a sheet steel part or extruded aluminum part.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary or background or the following detailed description.

Figure 1:
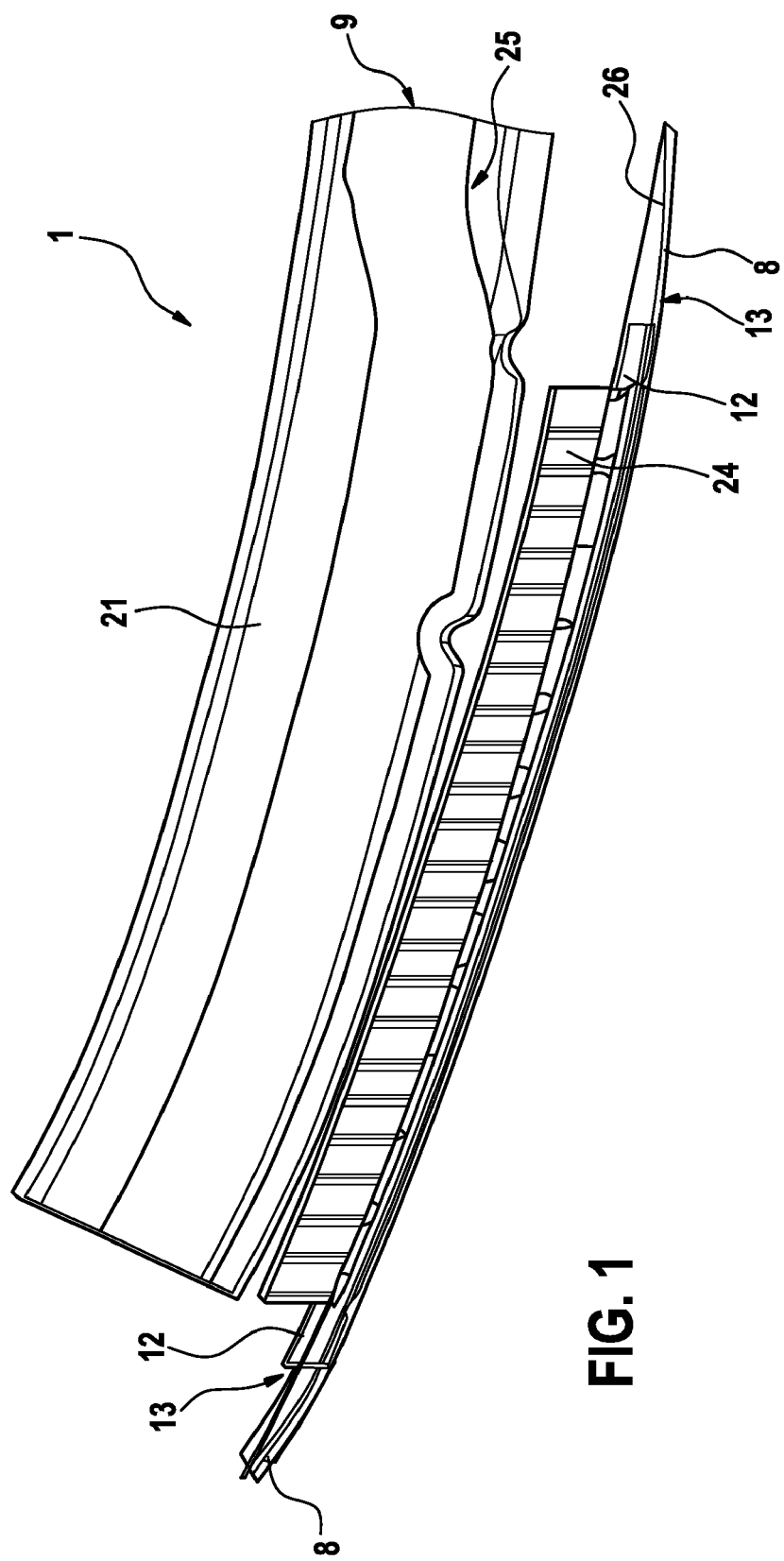
FIG. 1 shows a diagrammatic partial view of an impact limiting system, a first embodiment of the invention.

FIG. 1 shows a diagrammatic partial view of an impact limiting system 1, a first embodiment of the invention. In this embodiment of the invention, a bumper substructure 9 exhibits a transverse carrier 21, which conveys the impact energy to impact-absorbing elements of the bumper substructure 9 (not shown here). This transverse carrier 21 is covered by a cladding element 8, which is adjusted to the styling of a motor vehicle in the area of the bumper substructure 9, and is also referred to as bumper skin.

In the partial view shown here on FIG. 1, the cladding element 8 has not been mounted to a vehicle yet, but rather is situated remote from the transverse carrier 21 of the bumper substructure 9 to provide an open view of an impact force-conveying element 12 whose contour has been adjusted to an interior side 26 of the cladding element 8 and the rear side 25 of the transverse carrier 21.

When securing the cladding element 8 to the motor vehicle, this impact force-conveying element 12 occupies a gap arising between the cladding element 8 and bumper substructure 9, so that the dimensional stability and rigidity of the impact force-conveying element 12 make it possible, in particular at low collision speeds, to convey the impact energy to the transverse carrier 21, which in turn conveys the impact energy under a low deformation and/or elastic flexibility to the impact-absorbing elements of the bumper substructure 9 (not shown).

In addition to acting as a spacer 13 that fills the free space between the assembled cladding element 8 and assembled bumper substructure 9, the impact force-conveying element 12 exhibits an overhang 24, which can be put over the transverse carrier 21 so as to positively and/or non-positively join the impact force-conveying element 12 with the bumper substructure 9. In this embodiment of the invention, the impact force-conveying element 12 is positively joined with the cladding element 8, and extends over the entire width of the bumper substructure 9.

To this end, the positive joint is achieved by bonding the impact force-conveying element 12 with the inside 26 of the cladding element 8. Instead of a positive joint, however, screws, rivets or latching hooks can also be provided on either the cladding element 8 or bumper substructure 9 to secure the impact force-conveying element 12. The one-piece impact force-conveying element 12 extending over the entire width of the bumper structure 9 can also be replaced by partial segments of the cladding element 8 distributed over the width of the bumper substructure 9.

Figure 2:
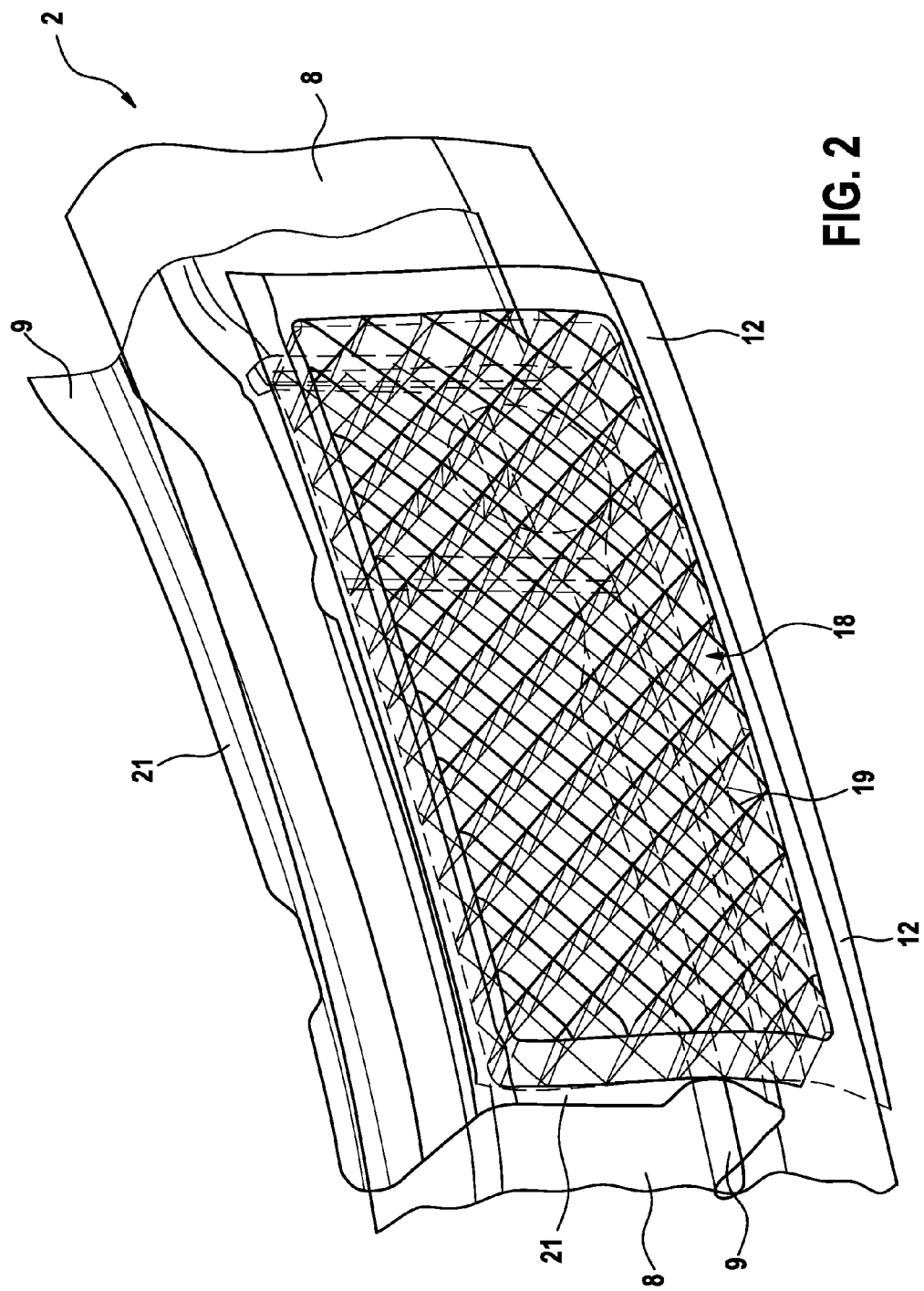
FIG. 2 shows a diagrammatic partial view of an impact limiting system, a second embodiment of the invention.

FIG. 2 shows a diagrammatic partial view of an impact limiting system 2, a second embodiment of the invention. In this partial view, the cladding element 8 curves over both the impact force-conveying element 12 and the bumper substructure 9. Only one section of the impact force-conveying element 12 is visible, while the structure of the impact force-conveying element 12 exhibits a honeycomb structure 18 so as to advantageously save on weight. The webs 19 of the honeycomb structure 18 can be massive, dimensionally stable and consist of a rigid material, so that the impact force acting on the cladding element 8 is directly conveyed to the bumper substructure 9, which also exhibits a transverse carrier 21 in this embodiment of the invention.

Figure 3:
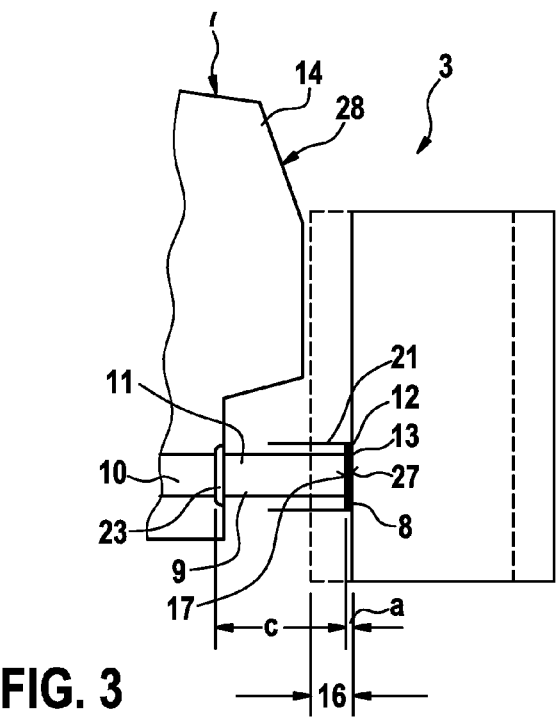
FIG. 3 shows a schematic drawing with an impact limiting system, a third embodiment of the invention.

FIG. 3 shows a schematic drawing with an impact limiting system 3, a third embodiment of the invention. This schematic drawing shows the rear area 28 of a vehicle 7, which is built upon a vehicle body 10, and exhibits the impact limiting system 3 on the vehicle body 10. Situated between the impact limiting system 3 and the vehicle body 10 is a metal part 23, for example one made of an extruded material, which the impact-absorbing elements 11 of the bumper substructure 9 act upon. The styling or design of this vehicle model 14 produces only a very slight distance a between the bumper substructure 9 and a cladding element 8, which is bridged by a dimensionally stable spacer 13 whose bumper-side contour 17 and cladding element-side contour 27 are adjusted to the bumper substructure 9 or the cladding element 8, so as to ensure a barrier penetration pathway 16 at a standardized impact load on the impact limiting system 3 at a constant depth c of the bumper substructure 9 without damaging the rear area 28 of this vehicle model 14.

Figure 4:
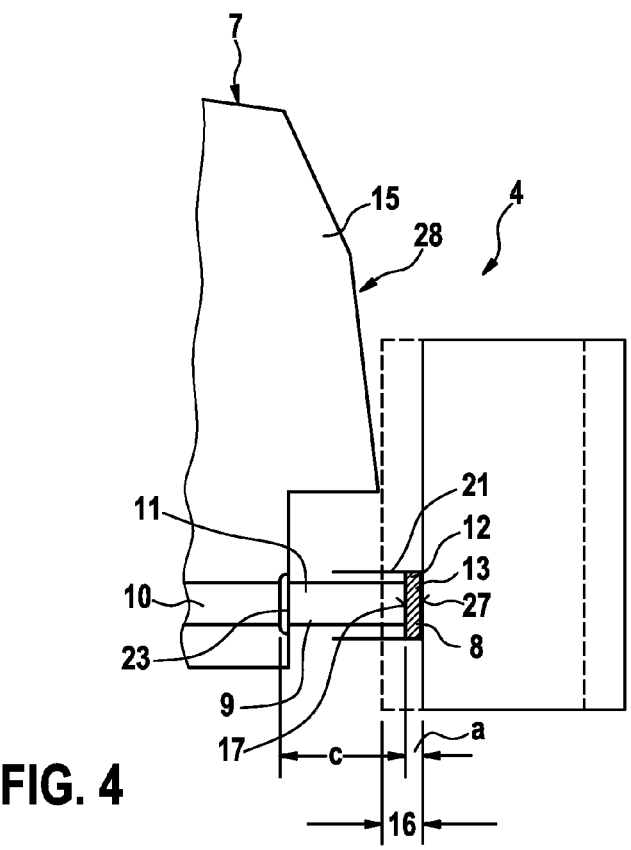
FIG. 4 shows a schematic drawing with an impact limiting system, a fourth embodiment of the invention.

FIG. 4 shows a schematic drawing with an impact limiting system 4, a fourth embodiment of the invention. Even though the rear area 28 of another vehicle model 15 clearly projects over the rear area 28 depicted on FIG. 3, a bumper substructure 9 can still be used for the different model at the identically constant depth c. Only the greater distance a between the cladding element 8 and bumper substructure 9 must be offset by a correspondingly enlarged spacer 13, so that the barrier penetration pathway 16 can her also be maintained at low collision speeds without damaging the rear area 28 of the vehicle model 15. As a result, identical bumper substructures 9 can be provided for varying model series, while still maintaining the absence of damage, for example to the rear area 28 for all models by adjusting only the impact force-conveying element 12 as the spacer 13 to the different styling or designs model series, or to the varying platforms.

Figure 5:
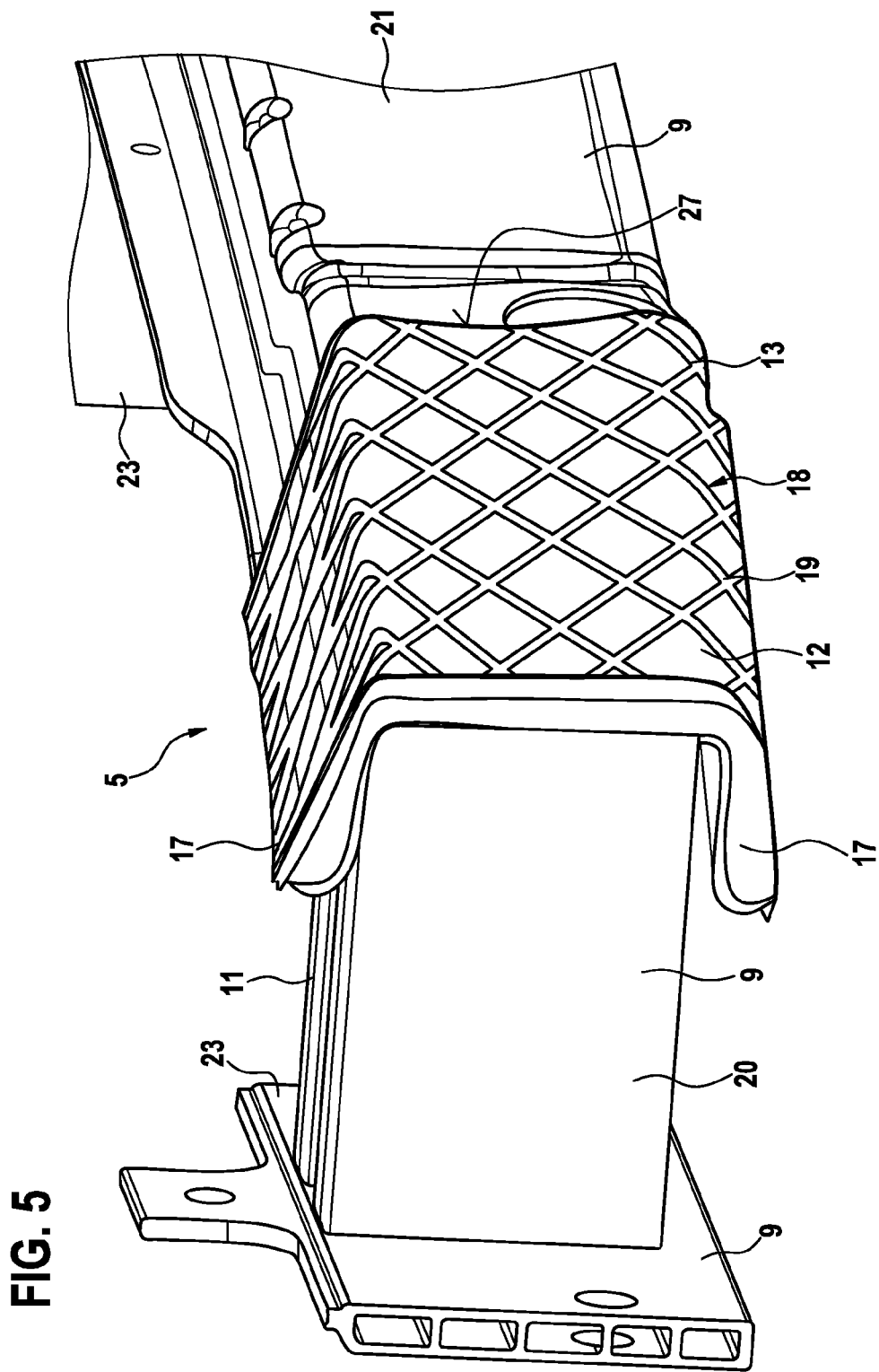
FIG. 5 shows a diagrammatic, perspective partial view of an impact limiting system, a fifth embodiment of the invention.

FIG. 5 shows a diagrammatic, perspective partial view of an impact limiting system 5, a fifth embodiment of the invention. In this figure, the cladding element is omitted in order to reveal the contour 27 toward the cladding element, and the honeycomb structure 18 of the impact force-conveying element 12. In this embodiment of the invention, the impact force-conveying element 12 largely envelops a transverse carrier 21, which is supported on impact absorbing elements 11 in the form of deformation elements 20, which are in turn secured to a metal part 23 that establishes the connection to the body as a transverse beam.

This transverse beam or metal part 23 exhibits an extruded aluminum alloy in this embodiment of the invention. The transverse carrier 21 can be a sheet steel part or injection molded aluminum part, while the deformation elements 20 are configured in such a way that they can absorb a correspondingly high impact energy through deformation at low collision speeds. Even through the impact force-conveying element 12 in this embodiment of the invention partially envelops the bumper substructure 9, it is still possible to have other configurations in which the impact force-conveying element 12 is partially enveloped by the transverse carrier 21.

The webs 19 of the honeycomb structure 18 are dimensioned in such a way that as to be able to convey a correspondingly high impact force. They are also aligned in the impact direction. As shown by this impact force-conveying element 12, the honeycomb structures 18 exhibit a checkerboard layout, although polygonal, in particular hexagonal, structures are also possible.

Figure 6:
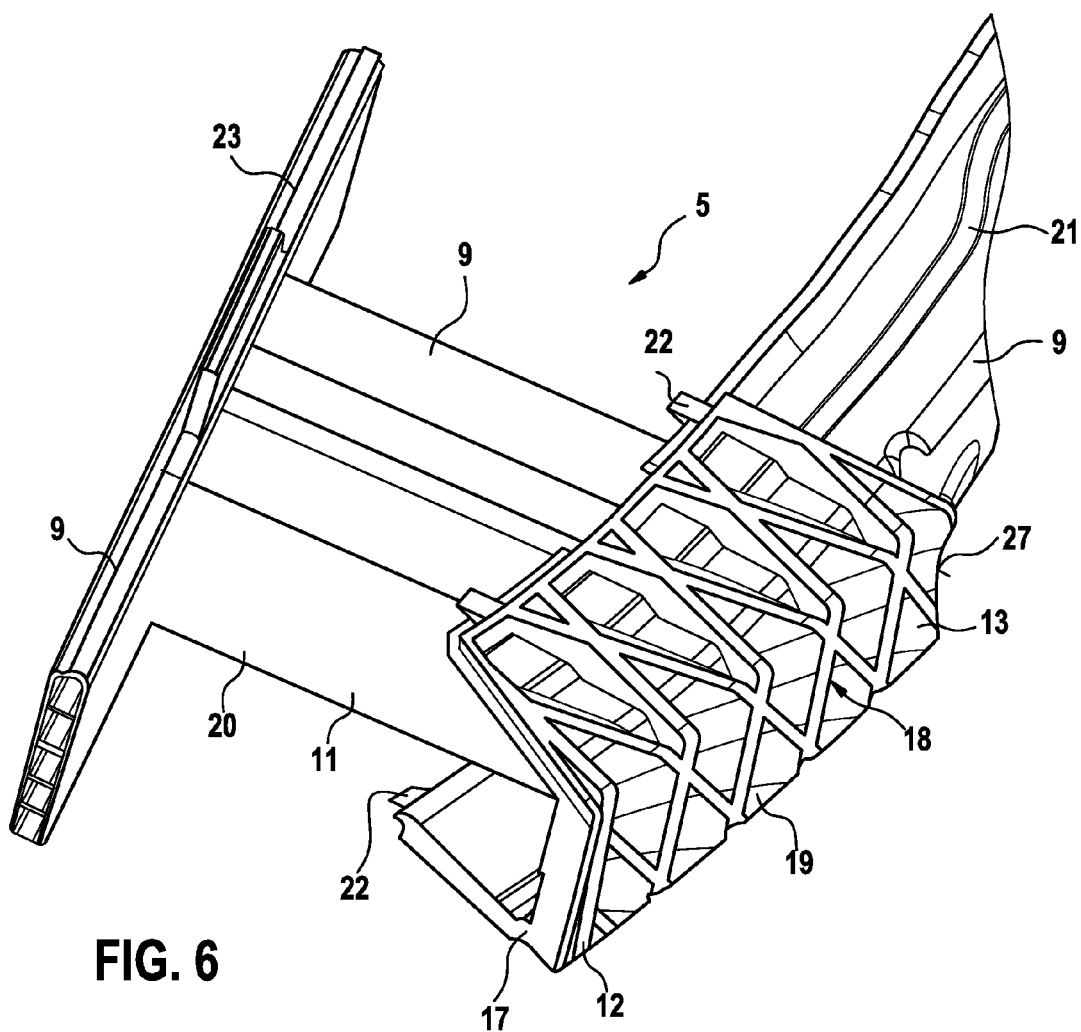
FIG. 6 shows a diagrammatic, perspective partial view of an impact limiting system according to FIG. 5 from another viewing angle.

FIG. 6 shows a diagrammatic, perspective partial view of the impact limiting system 5 according to FIG. 5 viewed at another angle, now revealing how the impact force-conveying element 12 is secured to the transverse carrier 21 by means of latching hooks 22. These latching hooks 22 positively clip over the edge of the transverse carrier 21 while attaching the impact force-conveying element 12, so that the impact force-conveying element 12 becomes secured to the transverse carrier 21, as opposed to the embodiment on FIG. 1.

Figure 7:
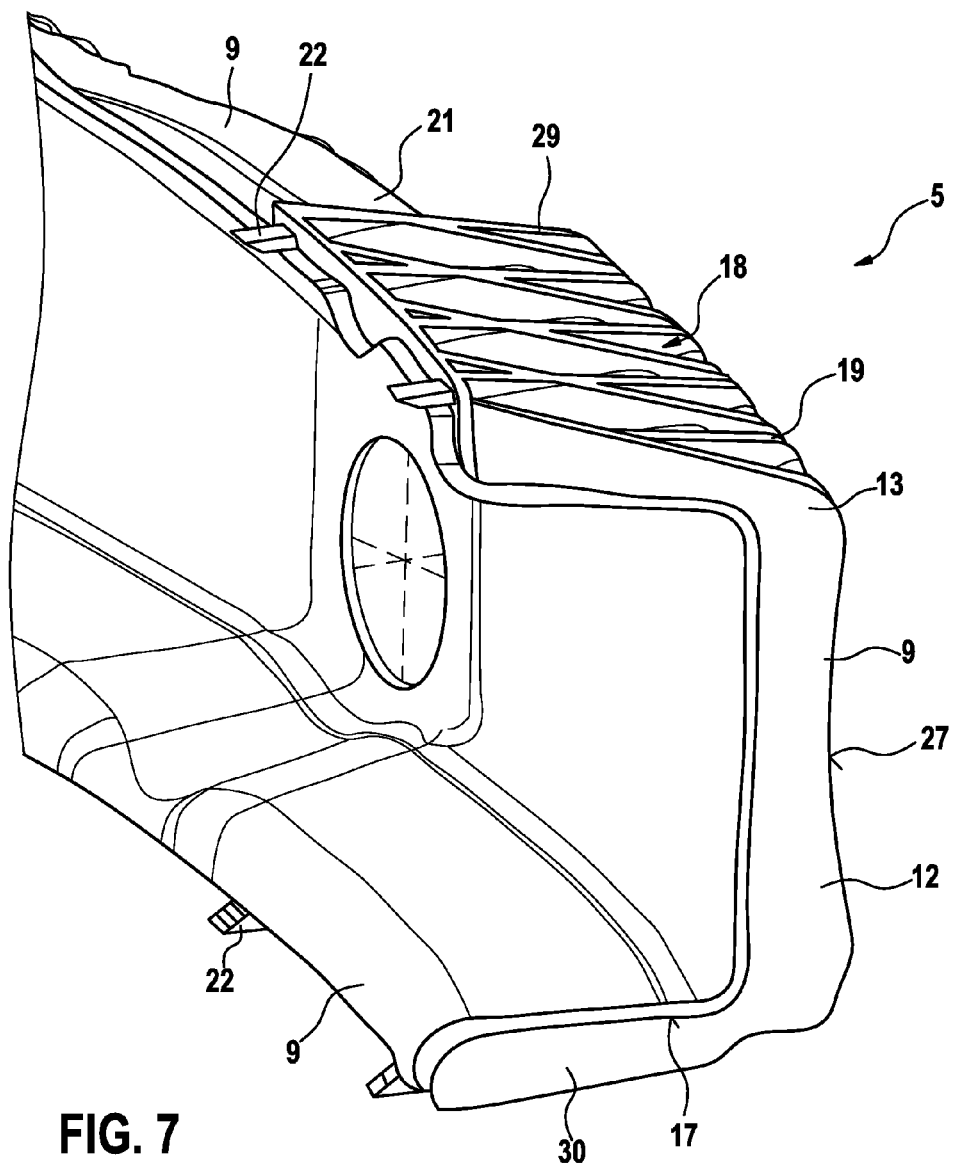
FIG. 7 shows a diagrammatic, perspective partial view of an impact limiting system according to FIG. 5 from yet another viewing angle.

FIG. 7 shows a diagrammatic, perspective partial view of the impact limiting system 5 according to FIG. 5 viewed at yet another angle. As evident here, the contour 17 of the impact force-conveying element 12 is precisely adjusted to the contour of the transverse carrier 21, and the latching hooks 22 of the impact force-conveying element 12 are positively secured to the transverse carrier 21. The shape of the impact force-conveying element 12 corresponds to a large "C", wherein the legs 29 and 30 of the C-shape do not contribute to conveying the impact force, but rather enable and support the securing function of the latching hooks 22.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An impact limiting system of a vehicle having a vehicle body, comprising:
impact absorbing deformation elements extending from the vehicle body and aligned with an impact force direction, wherein the impact absorbing deformation elements elastically deform for low impact forces;

a transverse carrier supported on the impact absorbing deformation elements for conveying impact energy to the impact absorbing deformation elements, the transverse carrier having an outer surface, wherein the transverse carrier is dimensionally stable but flexible such that it elastically deforms for low impact forces;

a cladding element forming an outer bumper skin that covers the transverse carrier, the cladding element having an interior surface, wherein the outer surface of the transverse carrier is spaced apart from the interior surface of the cladding element such that a gap arises between the entire outer surface of the transverse carrier and the entire interior surface of the cladding element; and an impact force conveying element between the interior surface of the cladding element and the outer surface of the transverse carrier and completely filling the gap, the impact force conveying element attached and fixed to both the outer surface of the transverse carrier and the interior surface of the cladding element; wherein contours of the impact force conveying element are adjusted to contours of the transverse carrier and the cladding element; and the impact force conveying element is formed from a dimensionally stable and rigid material that conveys low impact forces acting on the cladding element to the transverse carrier.

2. The impact limiting system according to claim 1, wherein the impact force conveying element forms a spacer, and balances a styling difference between a plurality of vehicle models relative to a barrier penetration pathway.

3. The impact limiting system according to claim 1, wherein the impact force conveying element comprises a dimensionally stable, structured plastic compound.

4. The impact limiting system according to claim 3, wherein the plastic compound exhibits a particle-filled plastic compound with a hard material particle fill level of about 40% v/v to about 80% v/v.

5. The impact limiting system according to claim 1, wherein the impact force conveying element comprises a dimensionally stable, structured metal construction.

6. The impact limiting system according to claim 1, wherein the impact force-conveying element exhibits a honeycomb structure.

7. The impact limiting system according to claim 6, wherein webs of the honeycomb structure are aligned in the impact force direction.

8. The impact limiting system according to claim 1, wherein the impact force conveying element at least partially envelops the transverse carrier.

9. The impact limiting system according to claim 1, wherein the cladding element comprises attachment elements adapted to secure the impact force conveying element.

10. The impact limiting system according to claim 1, wherein the impact force-conveying element is arranged as a single piece over at least a partial width of the transverse carrier.

11. The impact limiting system according to claim 1, wherein the transverse carrier comprises a metal part.

* * * * *